No. 868,094. PATENTED OCT. 15, 1907.
W. J. JERKINS.
FORK.
APPLICATION FILED SEPT. 15, 1906.
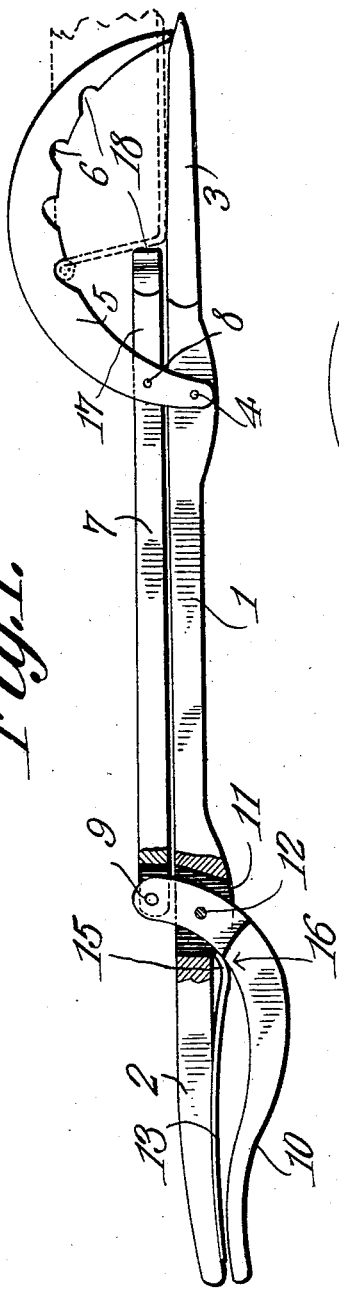
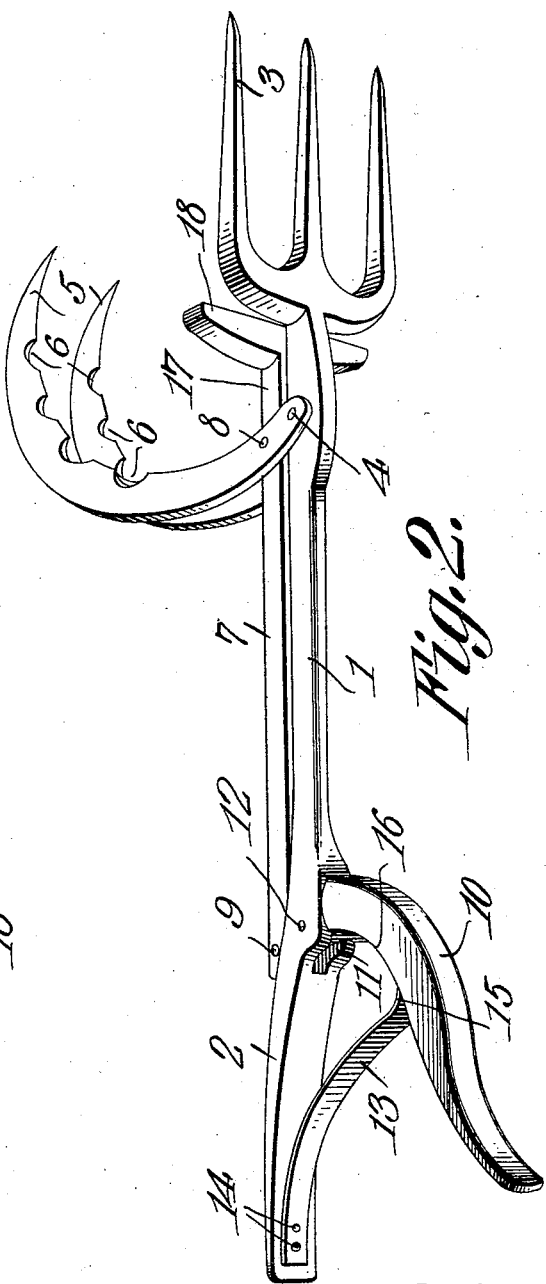
WITNESSES:
William J. Jerkins,
INVENTOR.
BY C. A. Snow & Co.
ATTORNEYS

UNITED STATES PATENT OFFICE.

WILLIAM J. JERKINS, OF MOULTRIE, GEORGIA.

FORK.

No. 868,094.   Specification of Letters Patent.   Patented Oct. 15, 1907.

Application filed September 15, 1906. Serial No. 334,726.

*To all whom it may concern:*

Be it known that I, WILLIAM J. JERKINS, a citizen of the United States, residing at Moultrie, in the county of Colquit and State of Georgia, have invented a new and useful Fork, of which the following is a specification.

This invention relates to forks such as are adapted particularly for use in handling any articles or things which are hot, such, for example, as baking pans, hot meats, vegetables, etc.

The objects of the invention are to improve and simplify the construction of such devices; furthermore, to increase their efficiency in use and to decrease the expense attending their manufacture.
With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification:—Figure 1 is a side elevation, partly in section, of a fork constructed in accordance with the present invention, the curved claws being shown in closed position; and Fig. 2 is a perspective view, showing the claws in opened position.
Like reference numerals indicate corresponding parts in the different figures of the drawings.

The improved fork of the present invention is constructed with a shank 1 having a handle end 2 and an engaging end or head 3. The engaging end or head 3, which is designed to be engaged with the article to be handled by the fork, is preferably in the form of a plurality of prongs, as shown, and is flat. Pivotally connected with the shank 1 adjacent the engaging end 3 thereof, as indicated at 4, is one or more claws 5. Each of the claws 5 preferably is curved as shown, and is formed along its inner edge with a plurality of notches 6, adapted to receive the rim of a pan or other article, as will hereafter appear.

The means for operating the claws 5 preferably consists of a link rod 7 which is pivotally mounted between the claws 5, as indicated at 8. The link rod 7, at the end thereof nearest the handle portion 2, is pivotally connected at 9 with a handle lever 10. The handle lever 10 is curved, as shown, and extends through a slot 11 in the shank 1, said handle lever 10 being pivotally mounted in the slot 11, as indicated at 12.

The means for normally holding the handle lever 10 separated from the handle portion 2 of the shank 1 and for consequently moving the claws 5 away from the engaging end 3 of the fork, preferably consists of a flat spring 13 which is connected with the handle portion 2, as indicated at 14, and is curved or bent at its rear end, as indicated at 15, so as to bear against the inner curved edge 16 of the handle lever 10. It will be understood that when the handle lever 10 is grasped in the hand and drawn toward the handle 2 of the fork, the claws 5 will be moved toward the engaging end 3 of the fork so as to grasp any article located between said engaging end 3 and said claws.

When the improved fork is employed for handling a kitchen pan, such as indicated by the dotted lines in Fig. 1, the engaging end 3 of the fork is fitted beneath the bottom of the pan and the handle lever 10 is manipulated to move the claws 5 downward over one of the edges of the pan until said edge is engaged by one set of the notches 6. In order to prevent the pan from twisting or moving between the engaging end 3 and the claws 5, it is desirable to employ a shoulder or abutment which will fit against the outer rim of the pan adjacent the lower end thereof so as to steady the same. In order to provide a construction of the character indicated, the link rod 7 is extended forward beyond its point of connection with the claws 5, as indicated at 17, and is there provided with a cross-head or abutment 18, which, of course, moves forward and downward with respect to the engaging end 3 when the handle lever 10 is manipulated. It will be understood, therefore, that when a pan is in the dotted line position shown in Fig. 1, the engaging end 3 will be pressed up firmly against the bottom of the pan, the claws 5 will be held firmly against the upper edge thereof, and the cross-piece 18 will be pushed against the periphery of the pan adjacent the bottom thereof in such manner that the pan will be held tightly by the fork.

The improved fork of the present invention is strong, simple, durable and inexpensive in construction, as well as thoroughly efficient in use.

It will be noted that the supporting element of the utensil which is represented in the drawing as being in the form of a fork is designed for contact with the bottom of the vessel to be raised by means of the utensil, while the movable or pivotal element travels in a path toward and from the plane of the supporting element for the purpose of engaging one or other of its notches with the edge of the side wall of the pan or other receptacle, whereby the pressure of the movable element is toward the plane of the supporting element. The added security attained by the longitudinally movable element, it being noted that the movement of the notched element 5 is in a sense transverse of the length of the utensil, will be apparent because said longitudinally movable element serves not only to prevent independent longitudinal movement of the pan or receptacle, but holds the edge of the pan into contact and firm engagement with the abrupt wall of the notch with which it is engaged. This action of the longitudinally movable element also serves to prevent lateral swinging movement of the pan.

What is claimed is:

1. A utensil of the class described, having a supporting element adapted to be arranged beneath a vessel to be supported, a notched element carried by the supporting element and movable transversely toward and from the plane of the supporting element, and a bearing element also carried by the supporting element and movable parallel with the plane of the latter and connected to and coacting with the notched element for grasping a vessel resting on said supporting element.

2. A utensil of the class described having a supporting element adapted to be arranged beneath a vessel to be supported, a notched element carried by the supporting element and movable transversely toward and from the plane of the supporting element and having its notches provided with abrupt outer walls forming shoulders to engage the edge of the wall of the vessel arranged upon the supporting element, and a bearing element also carried by the supporting element and movable parallel with the plane of the latter and connected to the notched element to coact therewith for grasping a vessel resting on said supporting element.

3. A utensil of the class described having a supporting element adapted for arrangement beneath a vessel to be supported, a clamping element carried by the supporting element and movable transversely toward and from the plane of the supporting element, a bearing element also carried by the supporting element in operative relation to the clamping element and movable parallel with the plane of the supporting element for contact with the side walls of a vessel arranged on the supporting element, and connections between the supporting element and the bearing and transversely-movable elements whereby the said bearing and transversely-movable elements may be simultaneously operated.

4. A utensil of the class described having a supporting element for arrangement beneath a vessel to be supported, an engaging element connected to the supporting element for movement transversely toward and from the plane of the supporting element, a bearing element connected to the supporting element in operative relation to the engaging element and movable parallel with the plane of the supporting element for contact with the walls of a vessel respectively supported and engaged by the previously-named elements, a pivotal connection between the bearing element and the transversely-movable element, and means carried by the supporting element for imparting longitudinal movement to the bearing element.

5. A device of the character described having an engaging end, a claw pivotally connected with said engaging end, a handle lever pivotally connected with said device, and a link connecting said handle lever with said claw, said link having one of its ends extended beyond said claw and provided with a cross-piece, for substantially the purposes set forth.

6. A device of the character described, comprising a body portion having an engaging end, a claw movably mounted on said body portion in position to coöperate with said engaging end to clasp an object, a rod attached to said claw for operating the same, and a cross piece on said rod and disposed between said claw and said engaging end of the body portion.

7. A device of the character described comprising a shank having an engaging end and a handle end, a pair of curved claws pivotally connected with said shank adjacent the engaging end thereof, said claws having notches in their inner edges, a link rod pivotally connected with said curved claws and having one of its ends extended beyond said claws and provided with a cross-piece located between said claws and said engaging end, a handle lever pivotally connected with said shank and said link rod, and a spring interposed between said handle lever and the handle portion of said shank.

In testimony that I claim the foregoing as my own, I have hereto affixed my signature in the presence of two witnesses.

WILLIAM J. JERKINS.

Witnesses:
A. W. CHASE,
S. T. MERCER.